UNITED STATES PATENT OFFICE.

FRANK O. LINDGREN, OF MINNEAPOLIS, MINNESOTA, ASSIGNOR, BY DIRECT AND MESNE ASSIGNMENTS, TO JOHN WASHBURN, OF MINNEAPOLIS, MINNESOTA.

MACHINE FOR CRIMPING AND TYING SACKS.

1,196,466.      Specification of Letters Patent.      Patented Aug. 29, 1916.

Application filed July 7, 1913. Serial No. 777,670.

*To all whom it may concern:*

Be it known that I, FRANK O. LINDGREN, a citizen of the United States, residing at Minneapolis, in the county of Hennepin and State of Minnesota, have invented certain new and useful Improvements in Machines for Crimping and Tying Sacks, of which the following is a specification.

My invention relates to a machine for crimping and tying sacks such as paper sacks in which flour, cement, etc., may be packed and shipped.

It is the object of my invention to provide a machine having a traveling table upon which the sacks to be tied may be set, to provide means for crimping or gathering the top of said sack into a compacted and closed condition, means for laying a cord about said compacted sack mouth, means for forming a knot in the cord as same is laid, means for tightening the knot and cutting the cord after the knot is completed, the cord laying and knotting mechanism being controlled by the movement of the sack upon the platform.

The full objects and advantages of my invention will appear in connection with the detailed description thereof and are particularly pointed out in the claims.

In the drawings, illustrating the application of my invention in one form, Fig. 4ª is a detail sectional view of the clutching device.

Figure 7:
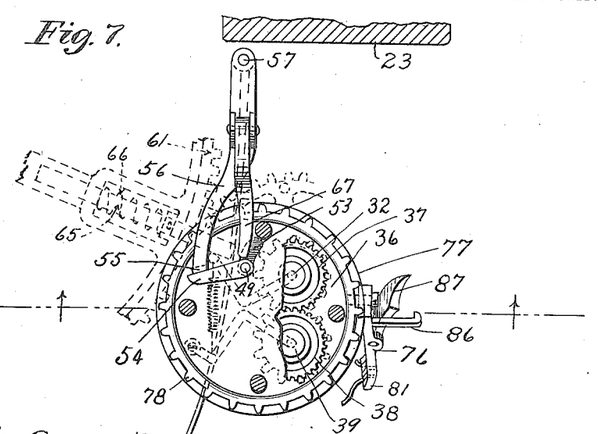

Upon a base 22 is formed an upright standard 23 and is positioned a source of power 24, which may be an electric motor pulley or other device for transmitting power. A vertical shaft 25 is mounted to rotate in bearings formed in brackets 26, 27 and 28 carried from standard 23, said shaft being adapted to be clutched for driving action to the driving member 24 by means of any suitable clutching device such as a friction clutch 27' controlled by double-acting foot lever and connections 28'. The shaft 25 has on the upper end thereof a sprocket wheel 29 which, by means of sprocket chain 30, drives a sprocket wheel 31 fast on the end of a short vertical shaft 32 supported in bearings on a shelf or bracket 33 extended from standard 23. The shaft 32 extends below the shelf 33 and has formed on the depending end thereof an elongated crimping roller 34 meshing with a similar crimping roller 35 carried by a cylindrical member 36 depending from the shelf 33. As shown in detail in Figs. 7 and 8, the shaft 32 has thereon within a cavity in member 36 a pinion 37 meshing with a pinion 38 on the shaft 39 of crimping roller 35, by which crimping roller 35 is positively driven in coördination with crimping roller 34.

Figure 2:
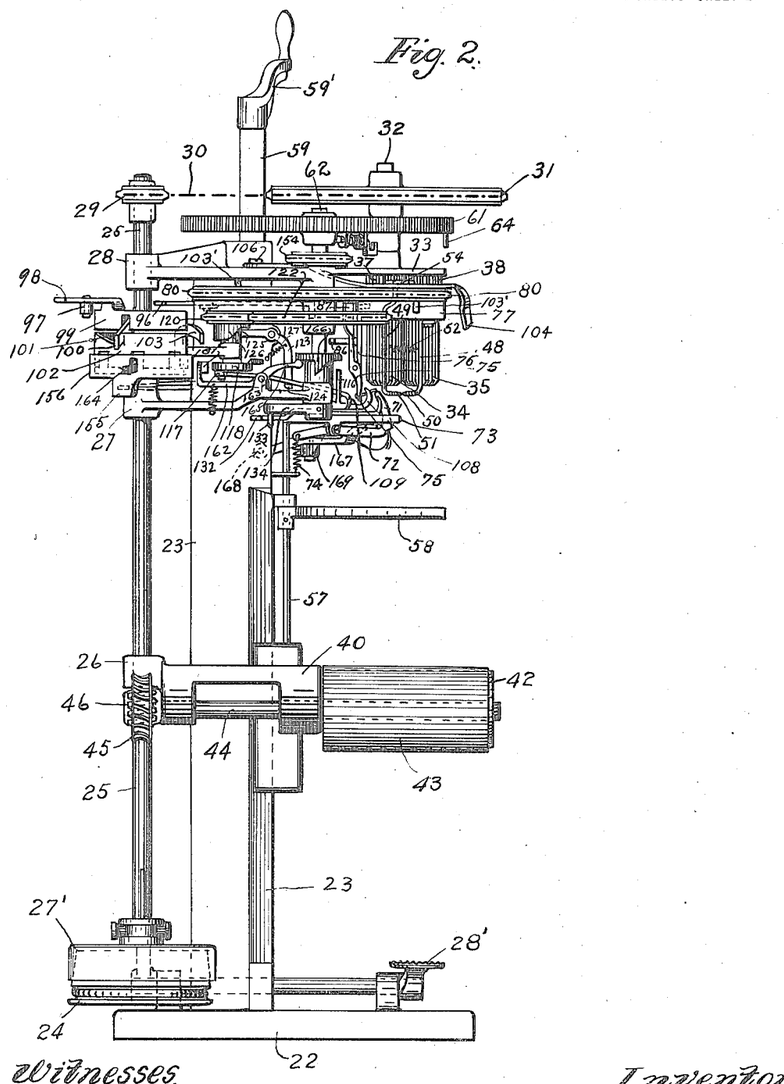
Fig. 2 is an end elevation of said machine viewed from the left of the machine, as illustrated in Fig. 1.

A platform 40 is supported from standard 23, having journaled at either end thereof rollers 41 and 42 over which runs an endless conveyer belt 43. As shown in Fig. 2, the shaft 44 of roller 42 extends outwardly through a bearing in bracket 26 and has thereon a worm gear 45 meshing with a worm 46 splined for sliding movement on shaft 25. It will thus appear that whenever shaft 25 is driven the crimping rollers 34 and 35 and the feed belt 43 will also be continuously driven. The platform 40 is slidably secured to standard 23 and is supported and adjusted vertically by a vertical shaft 59 threaded through a block 40' formed on platform 40, said shaft 59 being provided with a hand crank 59' by which the same is turned for adjusting the vertical height of the platform 40 to accommodate the same to sacks of different heights.

Figure 1:
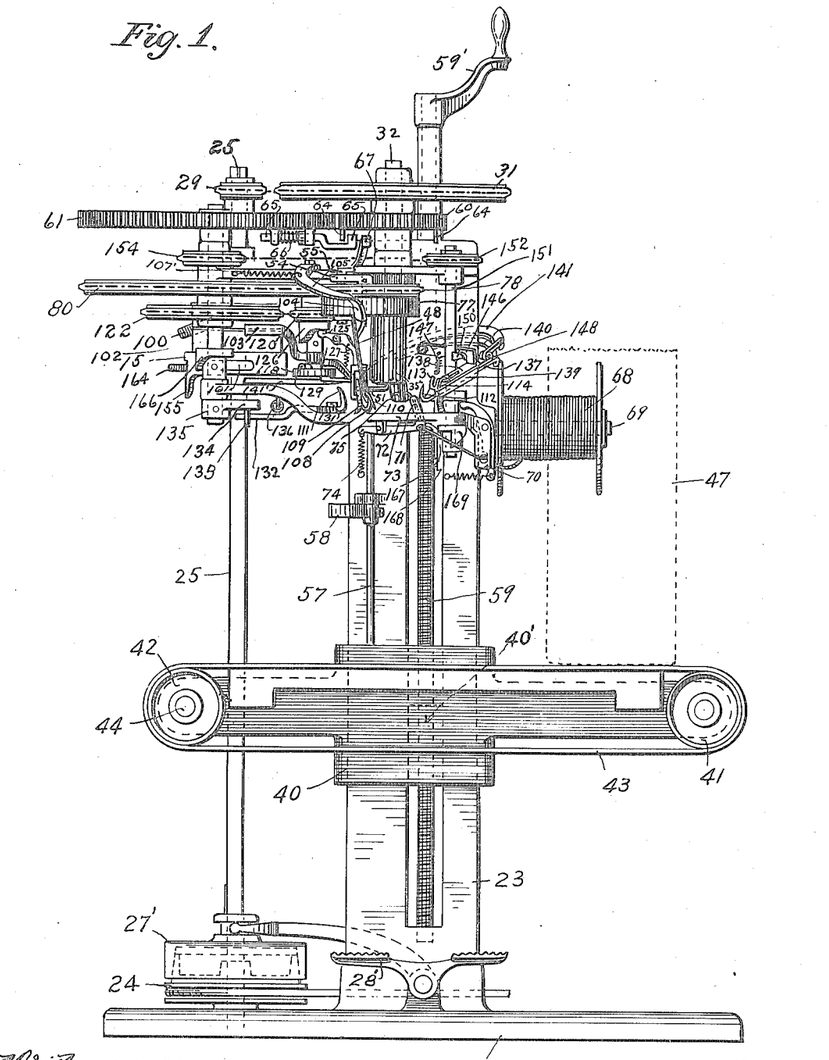
Figure 1 is a side elevation of a machine embodying my invention.
Figure 5:
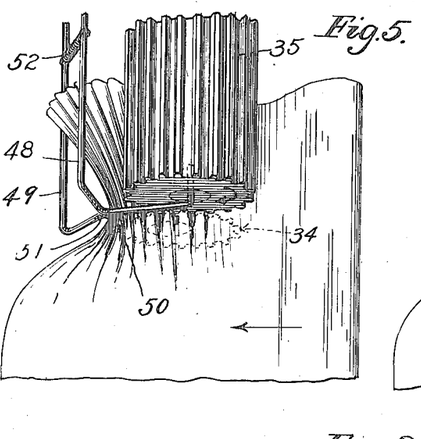
Figs. 5 to 8, inclusive, are various detail views of the crimping mechanism.
Figure 6:
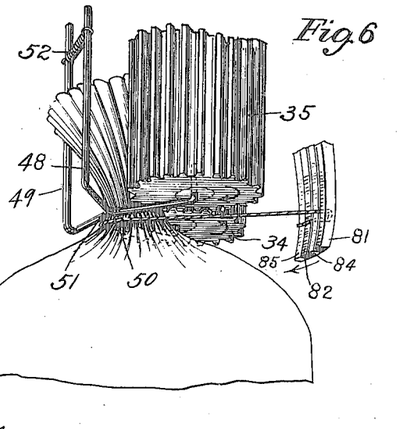

A sack such as indicated in dotted lines at 47 is fed along upon belt 43 with the mouth extended until the same reaches the crimping rollers 34 and 35, when it will be progressively crimped and gathered together as indicated in Figs. 5 and 6, a pair of retaining bars 48 and 49 pivotally connected at their lower ends with the axial centers of crimping rollers 34 and 35 and having inturned angular portions 50 and 51 yieldingly held in contact by a spring 52 extended between the same and locked, by means later to be described, retaining said crimped and gathered portions of the sack mouth until the forward movement of the sack on the platform timed to permit complete tying of the sack sets in operation mechanism for unlocking said bars. As shown in Figs. 1 and 2, the bar 48 has its upper end bolted to the underside of depending piece 36, while bar 49 has the upper end extended rearwardly and upwardly through a slot 53 to a trigger piece 54 to which said upper end of bar 49 is rigidly attached. Said trigger piece 54 is normally engaged by downturned end 55 of an arm 56 on a rock shaft 57, said rock shaft having thereon an arm 58 in the path of the sacks upon the conveyer 43.

Figure 3:
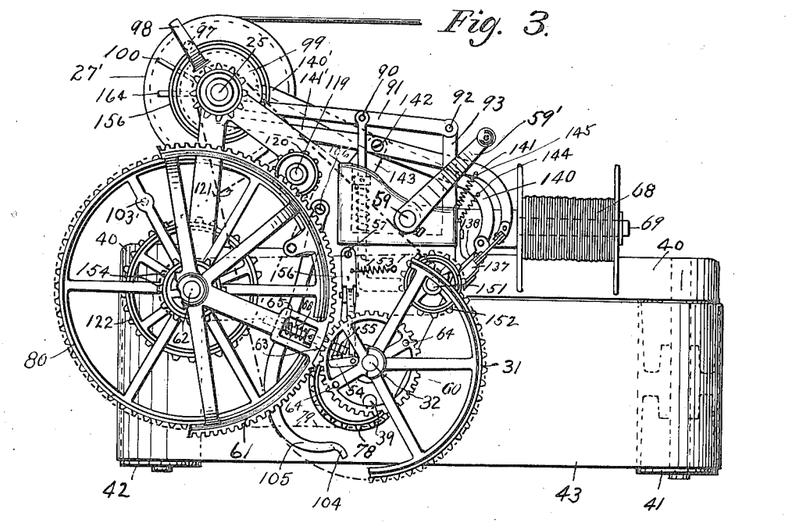
Fig. 3 is a top plan view with some parts broken away.

Upon the shaft 32 is a spur gear 60 adapted to mesh with a large spur gear 61 on a vertical shaft 62 mounted on bearings in brackets offset from standard 23. The spur gear 61 and parts connected thereby drive the various mechanisms for laying the cord about the gathered mouth of the sack and tying said cord. Said spur gear is of such size in relation to the spur gear or pinion 60, and in relation to the knotting mechanism, that one complete revolution of the spur gear 61 effected by spur gear 60 will complete the cord laying and tying operation. As shown in Fig. 3, the spur gear 61 has a mutilated portion 63, or portion without teeth, which, when it comes opposite the constantly driven pinion 60, breaks the connection between said pinion and the spur gear 61 and terminates the operation of the spur gear 61. The spur gear 60 has thereon pins 64, as best shown in Figs. 1 and 2, said pins being adapted to engage a trigger 65 mounted to slide radially on spur gear 61 and normally held by means of a spring 66 in a position such as not to be engaged by pin 64. The arm 56 on rock shaft 57 has thereon an arm 67 having the toe thereof positioned so as to engage the trigger 65 when the rock shaft 57 is actuated by a sack of flour engaging the arm 58. This results in pushing trigger 65 into the path of pin 64, which by engagement with said trigger moves the spur gear 61 until the teeth thereof come into mesh with pinion 60, thus starting operation of the cord laying and tying mechanisms.

Figures 8, 9, 10, 11:
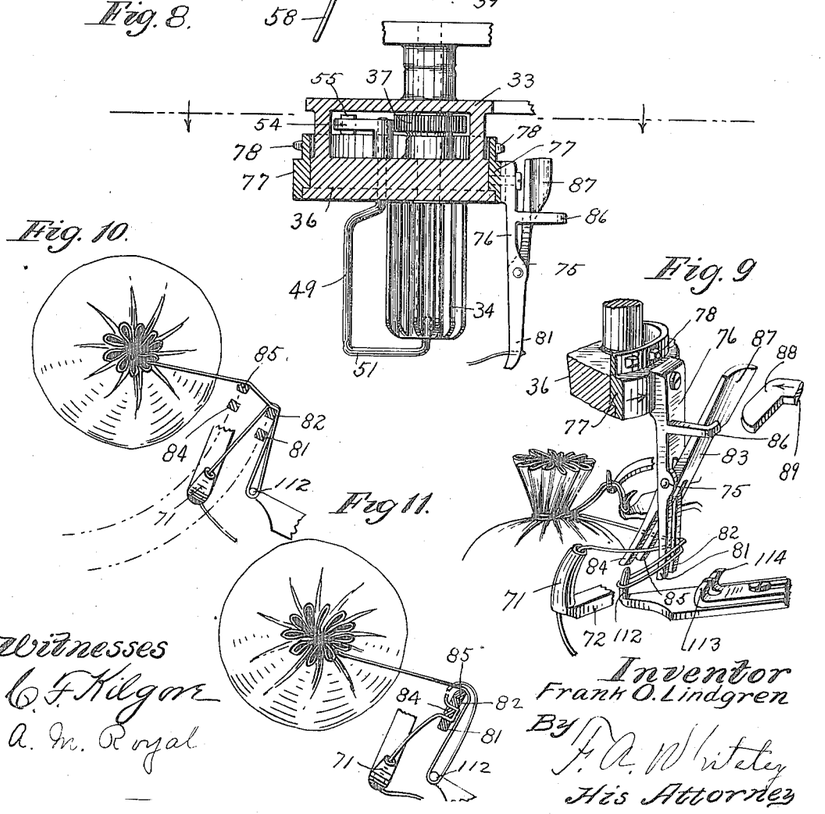
Figs. 9 to 11, inclusive, are views showing the operation of the tightener and cutting device.
Figure 12:
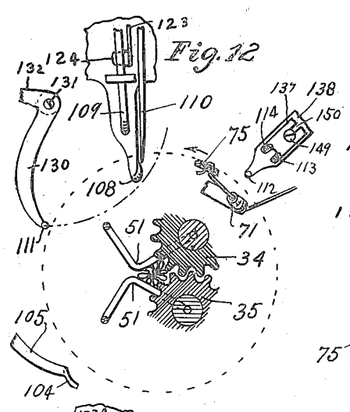
Fig. 12 is a view somewhat diagrammatic showing the position of the parts just before the beginning of the formation of the knot and loops about the bag mouth.
Figure 21:
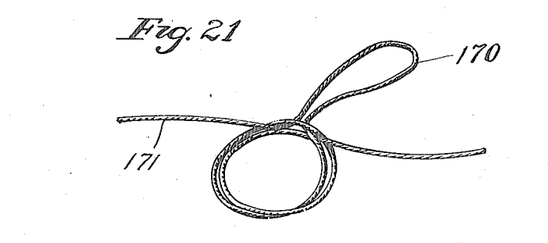
Fig. 21 is a view of the coils of rope with the knot in position.

The cord for tying the sack is drawn from a reel 68 mounted upon a spindle 69 and passes through a tension member 70 from which it extends through a hollow guide finger 71 on a lever 72 pivoted to a frame-piece 73, said lever being normally held by means of a spring 74 so that the guide finger 71 extends above the frame-piece 73, the end of said finger coming above a horizontal plane extending through the bottom of a vertically disposed cord gripping and cutting member 75 to which the end of the cord is attached. The gripping and cutting member above mentioned is also the cord laying device and comprises a portion 76 extending vertically from and rigidly secured to a ring 77 journaled upon the cylindrical piece 36 and having formed thereon a sprocket wheel 78 driven by sprocket chain 79 from a large sprocket wheel 80 on the shaft 62. The ratio of gearing between sprocket wheels 80 and 78 is such that one full revolution of shaft 62 (operated by gear 61, as heretofore described) will effect three complete revolutions of the ring 77 and cord laying member 75, which results in the laying of two complete loops of cord about the gathered mouth of the sack and the releasing, regrasping and cutting of the cord, with the formation of the knot by coöperating instrumentalities, as illustrated in Fig. 21. As best shown in Figs. 9 and 10, the depending member 76 comprises a lower bifurcated portion forming separated ends 81 and 82. A similarly bifurcated member 83 is pivotally secured to member 76 and lower bifurcated end portions forming arms 84 and 85 adapted to be forced between the ends 81 and 82 to pinch and grip the cord, as best shown in Fig. 11. The outer portion of arm 82 is formed with a shear edge which coöperates with a similar shear edge on the arm 85, forming the other part of the bifurcated portion of pivoted member 83.

Figure 4:
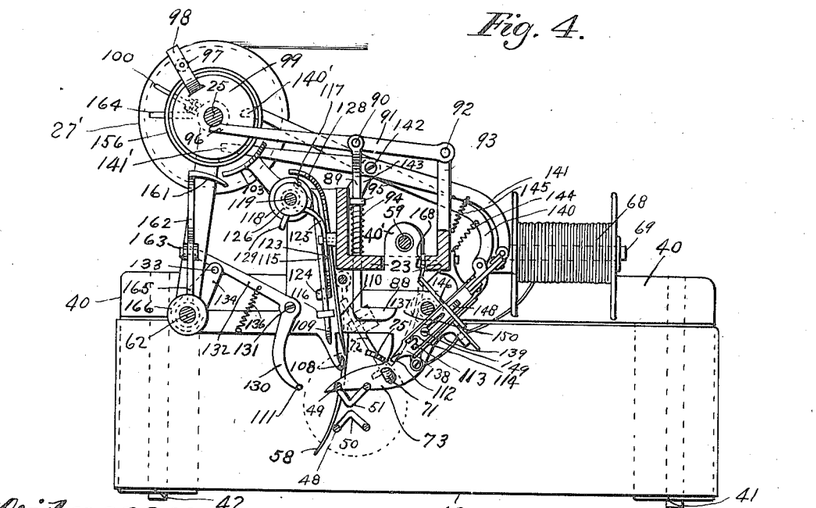
Fig. 4 is a sectional plan view taken through the machine below the crimping rollers and viewed from above.
Figure 4A:
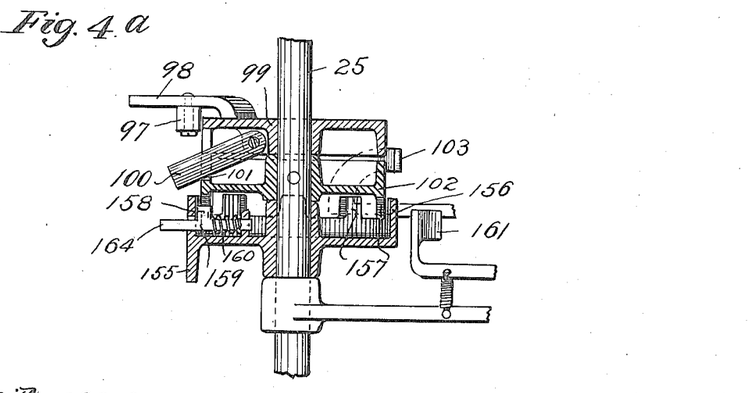

A hook-like extension 86 is formed on the member 76 and engages the pivoted member 83 above the point of pivot thereof, limiting the outward extent of movement of said member. This pivoted member is provided with a cam-like wing 87 adapted to be engaged at the proper time on the outside by a pusher head 88 on the end of a rod or link 89 pivotally connected at 90 to an arm 91, which in turn is pivoted at 92 to a bracket 93 extended from standard 23. The rod 89 has, as best shown in Fig. 4, a sliding bearing in an opening through standard 23. A spring 94 surrounds rod 89 between the wall of standard 23 and a collar 95 on said rod, normally holding rod 89 and arm 91 in their outer position in which a cam head or face 96 on the arm 91 engages the shaft 25. The arm 91 is in the path of a roller cam 97 depending from an arm 98 carried by a hub 99 loose on shaft 25. As best shown in Fig. 2, a catch 100 is pivoted to hub 99 and is adapted to fall into a notch 101 formed in the upper surface of a complemental drum 102 fast on shaft 25, the catch 100 being normally held inoperative upon the surface of a curved arm or rest 103. At the proper moment to permit catch 100 to drop into notch 102 and connect drum 99 with drum 102, a pin 103′, depending from the underside of sprocket wheel 80, engages said latch 100, and carries the same from off the end of rest 103. The sprocket wheel 80, of course, is given but one revolution for each complete operation of the machine and pin 103′ is so positioned as to effect clutching-in of drum 99 for driving action at the proper time to cause roller 97 to present pusher 88 to effect closing of the cord layer and cutter members, this closure operating, as indicated in Fig. 11, simultaneously to grip the end of the cord and sever the same outside of the point gripped. The cord layer is held in this position by the pinching of the strands of cord between the sides of member 84 and the adjacent sides of fingers 81 and 82. The cam head 87 also serves the purpose of separating the cord holding members at the proper time, and this is effected by means of a cam wing 104 on an arm 105 centrally pivoted at 106 to a frame member 107 and normally held in position so that said cam wing 104 is out of the path of cam member 87 by means of a spring 107′. A stud 80′ projecting from the upper side of sprocket wheel 80, as best shown in Fig. 2, at each revolution of said sprocket wheel engages the curved rear portion of the arm 105 lying above sprocket wheel 80 and forces said arm inwardly so as to bring the cam member 104 into position to engage the inside of cam portion 87, thereby operating to spread the cord holding members and release the end of the cord. This takes place after the cord layer has placed three loops of cord about the gathered mouth of the sacks and after the knot has been practically formed. The head 87 is of such weight as to cause the members of the cord gripping device to swing into open position by gravity, after which the same is carried in open position over the guide 71, as indicated in Figs. 9 and 10, bringing the cord, as it comes from the guide, again between the gripping members, whereupon the pusher head 88 is operated in the manner above described to close the members, severing the cord and taking a fresh grip on the supply end, as indicated in Fig. 11.

The knotting instrumentalities and the method of forming the knot are illustrated somewhat diagrammatically in Figs. 12 to 20, inclusive. These comprise the cord laying and severing member 75, as above described, a fixed hook 108 over which each loop of cord is laid as it is carried about the sack mouth, a reciprocating hook 109 reversely turned with respect to hook 108 for taking the loop of cord from hook 109 and drawing the same backwardly, an oscillating lifter bar 110 for lifting the loop held by hook 109 over the hook 108, a looper hook 111 and a tightener hook 112, the looper hook being operative to pull the last loop formed from off the fixed hook 108, coöperating with the tightener hook, which moves in an opposite direction thereto, to draw the knot formed tight and hard at the close of the tying operation.

Figure 13:
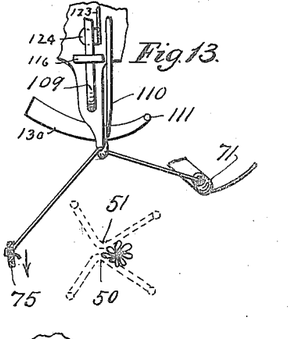
Figs. 13 to 20, inclusive, are diagrammatic views showing the operation of the parts in tying and knotting the cord about the gathered sack top, Figs. 15 to 19 inclusive having associated therewith diagrammatic representations of the formation of the knotted sets of loops corresponding to the progress of said operations represented by the respective figures.
Figure 14:
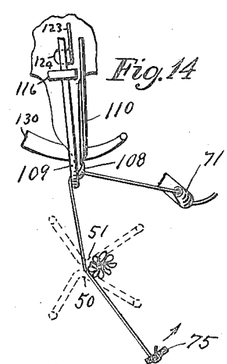
Figure 15:
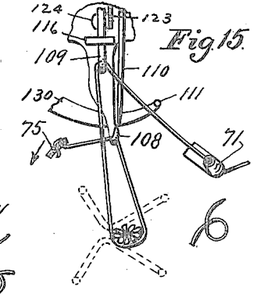
Figure 16:
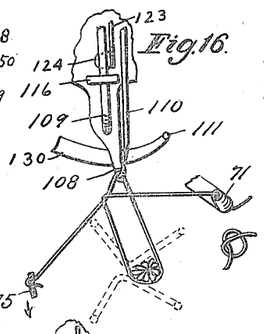
Figure 17:
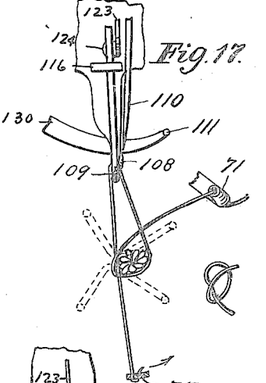
Figure 18:
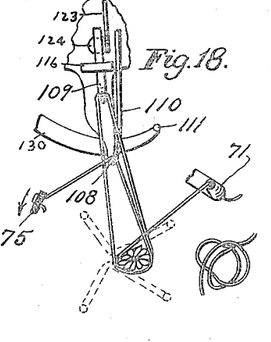
Figure 19:
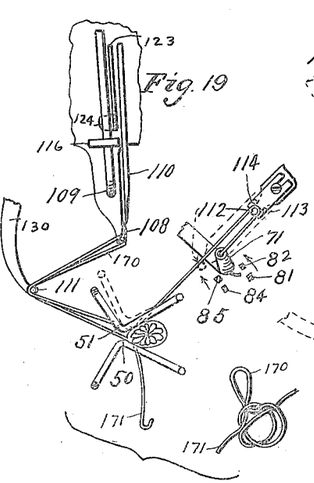
Figure 20:
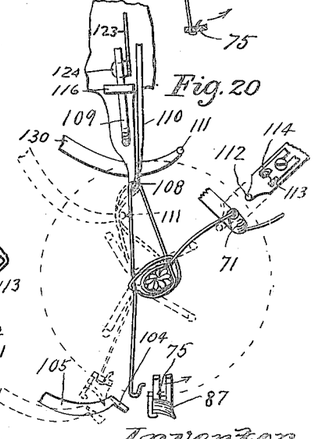

Following the operation of these instrumentalities, as it appears in Figs. 12 to 20, inclusive, the cord layer 75 has just started on its first movement about the sack mouth, looper hook 111 being in its outer position. In Fig. 13, the cord layer has made half of the first revolution, placing the strand of cord over the fixed hook 108, while the looper hook 111 has gone forward into position to effect looping action. As shown in Fig. 14, the cord layer has continued its revolution, having nearly completed the same, and hook 109 has come forward and dropped over hook 108 so as to engage the cord preparatory to drawing the first loop thereof away from hook 108 and over lifter bar 110. As shown in Fig. 15, cord layer 75 is half way about in its second revolution and has laid a second loop of cord upon the stationary hook 108, while reciprocating hook 109 has drawn the first loop back and above the lifter bar 110. As shown in Fig. 16, the cord layer 75 has continued its revolution and the reciprocating hook 109 has been lifted, releasing the cord, the lifter bar 110 coming up at the same time so that the releasing loop extending from guide 71 comes over the second loop formed. Fig. 18 shows the parts after the cord layer 75 has completed a revolution from its position shown in Fig. 16, or has completed two-and-one-half revolutions, reciprocating hook 109 having drawn back the second loop formed above lifter bar 110, while the last coil of the cord is held upon stationary hook 108. As shown in Fig. 19, the cord layer has continued its revolution so that cam member 87 has engaged cam member 104 which has been brought into the path of the same, opening the holding members of the cord layer to release the end of the cord, and, as indicated in dotted lines, the next short portion of the movement of cord layer 75 is accompanied by movement of looper hook 111 and movement of tightener hook 112 below the strand of cord extending from guide 71, said guide simultaneously being dropped down so as to lay the cord therefrom over hook 112. It is noted that the tightener hook 112 after being engaged within the loop is first drawn back between a pair of hooks 113 and 114, by which the cord over the tightener hook 112 is clamped in position, further movement of the tightener hook operating to put the entire force thereof upon the knot. As shown in Fig. 20, the cord laying member with the parts 81, 82, 83 and 84 separated, has moved to a point at which said members are just about to pass on opposite sides of guide 71, which has again been elevated to its normal position, looper 111 having pulled out and extended the loop of cord from fixed hook 108, from which continued movement of said looper will remove the loop without disengaging the end of the cord from the knot, while tightener 112 has moved in its opposite direction, the coöperative movements of members 111 and 112 resulting in drawing a firm, hard knot. The loop and knot thus formed, as shown in Figs. 20 and 21, comprises a common method of tying sacks, particularly paper sacks containing flour or other material when such tying is done by hand. The knot so formed, which consists in alternately crossing the end strands of the cord between loops thereof, has long been recognized as one of the most efficient knots for the purpose and therefore has been extensively employed where tying by hand has been resorted to; but I believe myself the first to devise a machine for gathering together the mouth of a bag, laying a plurality of loops about the mouth so gathered and forming the above indicated knot while the loops are being laid, and I intend to claim the same broadly.

The means for operating the knot-forming hooks will now be described. As best shown in Figs. 1 and 4, the hook 109 is on a link or arm 115 adapted to reciprocate longitudinally and oscillate in a vertical plane within a slotted guide 116, the rear end of said arm 115 being pivoted at 117 to a disk 118 on the lower end of a short vertical shaft 119 mounted in a bracket extension from standard 23, the upper end of said shaft 119 having thereon a sprocket wheel 120 driven by sprocket chain 121 from a sprocket wheel 122 on shaft 62. The ratio of gearing between sprocket wheels 122 and 120 is such as to rotate shaft 119 three times for each rotation of shaft 62 and sprocket wheel 122. The hook 109 is thus reciprocated three times back and forth beyond hook 108. As shown in Fig. 2, a lever 123 has a toe 124 of a depending portion thereof extended beneath the link 115, being normally held in its lowered position by means of a spring 127, said lever 123 being centrally pivoted and the free end 125 being engaged by a cam 126 on shaft 119, which serves to rock lever 123 and lift link 115 during a portion of the reciprocation thereof to place the hook 109 over the loop of cord on fixed hook 108 and after drawing said loop back to remove the hook 109 therefrom, as has heretofore been pointed out. The lifter bar 110 heretofore referred to, is, as shown in Fig. 4, pivoted adjacent the central portion thereof and has a curved portion 128 extending into the path of a pin or projection 129 on disk 118, which projection engages said curved portion and oscillates the lifter bar so as to permit the loop drawn back by hook 109 to slide over stationary hook 108 as heretofore described.

As shown in Fig. 4, the looper hook 111 is on an arm 130 pivoted at 131 to a fixed part of the frame and having an arm 132 extending rearwardly from said point of pivot into position to be engaged by a pin 133 on an arm 134 carried by a hub 135 on shaft 62, a spring 136 holding said arm 132 in engagement with said pin 133 or the hub 135. It will be seen that for the major part of the revolution of shaft 62 the spring 136 will hold hook 111 in the position shown in Figs. 12 to 18, inclusive, the final looping action of said hook being effected very quickly by movement of arm 134. The hook 112 is carried by a plate 138 and hooks 113, 114 by a plate 137, said plates being relatively slidable with respect to one another and being carried upon a guideway bracket 139. The ends of plates 137 and 138, respectively, are connected with the ends of levers 140 and 141, said levers being pivotally secured near the centers thereof at 142 to a bracket 143. The levers 141 and 140 are normally actuated in a direction to bring hooks 112 and 113 into their lowered or most forward position for engaging the cord, when the guide 71 is dropped, by means of springs 144 and 145. A pivoted latch 146 is actuated by a spring 147 to engage in front of a catch 148 on plate 137 and hold said plate retracted and with it the plate 138 which is connected for relative movement to plate 137 by means of a screw or stud 149 extending through a slot 150 in the plate 137. At the proper time in the cycle of operations the catch 146 is lifted by means of a cam finger 150' on a vertical shaft 151 having on the end thereof a sprocket wheel 152 driven by a sprocket chain 153 from the sprocket wheel 154 on shaft 62, sprocket wheels 152 and 154 being of the same diameter so that shaft 151 and the parts carried thereby are rotated once for each revolution of shaft 62. The extended ends 140' and 141' of levers 140 and 141 are in a position to be engaged by a cam 155 on a drum 156 loosely mounted on shaft 25. As shown in Fig. 4ᵃ, the drum or pulley 102 constantly driven on shaft 25 rotates within the upturned flange of drum 156 and is provided with a series of notches 157. A latch 158 on a bolt 159 having the end thereof projected outside of the drum 156 is normally held by means of a spring 160 surrounding said bolt so that said latch engages in one of the notches 157 to cause the drum 156 to rotate with the driven member 102. A cam piece 161 on the end of a lever 162 centrally pivoted at 163 normally extends into the path of the projected end 164 of bolt or pin 159 under which conditions said bolt will be pushed inwardly to disconnect latch 158 from notches 157 and the drum 156 will remain stationary until the projecting end 165 of lever 162 is engaged by cam 166 on shaft 62 (as shown in Fig. 2), which operates to lift the cam piece 161 and release the latch pin 159. The drum 156 is then rotated and the cam 151 thereon first engages end 140' of lever 140 which pulls hook 112 back until the same engages and clamps the cord between hooks 113, 114. Immediately thereafter the cam 155 engages the end 141' of lever 141, which has the effect of pulling the two pieces 137 and 138 and the united hooks 112, 113, 114 with the cord clamped therein quickly outward drawing tight the knot.

Immediately after the latch 146 is actuated by cam pin 147 so that hook 112 comes forward in front of guide 71 and beneath the cord the said guide 71 is lowered beneath the frame piece 73. To effect this lowering action a lever 167 is pivoted at 168 to a portion of the standard 23 having the end thereof resting upon the lever 72, as shown in Figs. 1 and 2. The body of lever 168 is in the path of a cam 169 on shaft 151, which is positioned relative to cam pin 150, so that, as above stated, immediately after the action of said cam pin upon latch 146 to release hook 112, the cam 169 engages the lever 167 rocking the same downward, and with it the levers 72 carrying guide 71, against the force of spring 74.

The operation of my device has heretofore been very fully given and need not be repeated. It will be apparent, however, that my invention comprises a relatively simple and highly efficient machine for operating upon sacks of any desired size and crimping and gathering the mouth thereof and laying a series of folds of twine or cord about said mouth, tying said loops to form a knot such as illustrated in Fig. 21, drawing said loops and the knot formed thereon tight and hard and cutting and releasing the tied and knotted sack so as to leave what is commonly known as a bow-knot having a bow 170 and a pulling end 171, as shown in Fig. 21.

I claim:

1. A machine for tying sacks comprising a platform, means on the platform for feeding sacks through the machine, constantly-operative means for gathering the mouth of the sack into a compact bundle while the sack is being fed, normally-inoperative cord-laying and knotting means, and means actuated by movement of the sack on said platform to render said cord-laying and knotting devices operative.

2. A machine for tying sacks comprising a platform, means on the platform for feeding sacks through the machine, constantly-operative means for gathering the mouth of the sack into a compact bundle while the sack is being fed, normally-inoperative cord-laying and knotting means, means actuated by movement of the sack on said platform to render said cord-laying and knotting devices operative, and means for terminating the operation of said cord-laying and knotting devices after the same have been operated a sufficient time to form a complete knot.

3. A machine for tying sacks comprising constantly-operating means for gathering the mouth of the sack into a compact bundle, means for moving the sack while the mouth thereof is being gathered, normally-inoperative means for looping a cord about said compacted mouth and forming the same into a knot, and means controlled by movement of the sack for rendering said cord-laying and knotting means operative.

4. A machine for tying sacks comprising a platform, devices in fixed position for operating upon the mouth of the sack to close and tie the same, means to adjust the vertical height of the platform to bring the mouths of different sized sacks into position to be operated upon by said closing and tying devices, an endless belt on said platform for feeding the sacks along the same, and means to drive said endless belt in any position of adjustment of the platform.

5. A machine for tying sacks comprising means for gathering the mouth of the sack into a compact bundle, means for thereafter laying a plurality of loops of cord about said compacted mouth, means for successively crossing the loop first formed over the strands of a succeeding loop to provide a knot, means for cutting the cord and releasing the ends thereof, and means for drawing the loops and knot formed tight and hard.

6. A machine for tying sacks comprising means for gathering the mouth of the sack into a compact bundle, means for thereafter laying a plurality of loops of cord about said compacted mouth, means for successively crossing the loop first formed over the strands of a succeeding loop to provide a knot, means for cutting the cord and releasing the ends thereof, and means for drawing the loops and the knot tight and hard, said tightening means being operative after one end of the cord has been released and before the cord has been cut.

7. A machine for tying sacks comprising means for gathering the mouth of the sack into a compact bundle, means for thereafter laying a plurality of loops of cord about said compacted mouth, means for successively crossing the loop first formed over the strands of a succeeding loop to provide a knot, means for cutting the cord and releasing the ends thereof, and means for drawing the loops and the knot tight and hard, said tightening means being operative after one end of the cord has been released and before the cord has been cut, said tightening means operating to leave a pull-out bow connected with the said released end.

8. A machine for tying sacks comprising means for gathering the mouth of the sack into a compact bundle, means for thereafter laying a plurality of loops of cord about said compacted mouth, means for forming a knot while said loops are being laid, and means for drawing the loops and knot tight and hard.

9. A machine for tying sacks comprising a platform, means on the platform for feeding sacks through the machine, devices for looping a cord about the mouth of said sack and tying the same, normally inoperative-actuating means for said cord looping and tying devices, and means controlled by the feed of said sacks for rendering said actuating means operative.

10. A machine for tying sacks comprising a platform, means on the platform for feeding sacks through the machine, a pair of vertically disposed fluted rollers for engaging and progressively crimping the mouth of the sack, a pair of angularly disposed members spring held in contact for receiving and holding said crimped mouth in a compact bundle, means for locking said bars in contact, and means controlled by movement of the sack for releasing said locking means to permit the bars to separate and release the mouth of the sack.

11. A machine for tying sacks comprising means for gathering the mouth of the sack into a compact bundle, a cord gripping and laying device, means for rotating said cord laying device about the compacted mouth to form a plurality of loops of cord thereabout, means for forming a knot while said loops are being laid, said cord layer comprising separable members for holding the end of a cord between the same, means for separating said members to release the cord after said loops have been laid, and means thereafter to cause the separated members to engage the cord at the other side of the loops and simultaneously sever said cord and grip the end running to the cord supply.

12. A machine for tying sacks comprising means for gathering the mouth of the sack into a compact bundle, a cord gripping and laying device, means for rotating said cord laying device about the compacted mouth to form a plurality of loops of cord thereabout, a fixed hook within which each loop of cord is successively laid, and means for withdrawing each loop from the fixed hook before the succeeding loop is laid and thereafter after lifting said withdrawn loop over the hook and the succeeding loop to form a knot.

13. A machine for tying sacks comprising means for gathering the mouth of the sack into a compact bundle, a cord gripping and laying device, means for rotating said cord laying device about the compacted mouth to form a plurality of loops of cord thereabout, a fixed hook within which each loop of cord is successively laid, means for withdrawing each loop from the fixed hook before the succeeding loop is laid and thereafter lifting said withdrawn loop over the hook and the succeeding loop to form a knot, and tightening means including a device for drawing the strand of cord last laid upon the fixed hook from said hook so as to leave the same connected with the knot in the form of a pull-out bow.

14. In a machine for tying sacks, a cord gripping and laying device comprising a pair of pivotally connected scissors-like members adapted to be interlocked, one set of said members forming a clamp for gripping and holding the end of a cord and another set of said members forming a shear for cutting the cord, and means to operate said device including means for opening and closing said members in timed succession.

15. In a machine for tying sacks, a cord gripping and laying device comprising a pair of pivotally connected scissors-like members adapted to be interlocked, one set of said members forming a clamp for gripping and holding the end of a cord and another set of said members forming a shear for cutting the cord, means to move said cord laying device in a circular path, a cord supply and a guide therefor positioned so as to extend above the bottom plane of and adjacent the path of the cord laying device, and means to open said members to release the end of the cord at the proper point in the cycle of operations, said members when so released passing at either side of the guide so as to embrace the strand of cord extending from the cord supply, and means thereafter to close the members, thereby severing and re-gripping the end of the cord extending from the cord supply.

16. A machine for tying sacks comprising means for gathering the mouth of the sack into a compact bundle, a fixed hook, means for laying a plurality of loops of cord successively about said compacted mouth and within said hook, a reversely turned reciprocating and oscillating hook successively engaging the loop of cord within the fixed hook, drawing it from and leaving it above the plane of said fixed hook, and a lifter bar oscillating in a vertical plane for passing said loop over the top of the fixed hook and above the succeeding loop in said fixed hook and about the compacted mouth.

17. A machine for tying sacks comprising means for gathering the mouth of the sack in a compact bundle, means for thereafter laying a plurality of loops of cord about said compacted mouth, means for forming a knot while said loops are being laid, a cord supply and a guide for said cord for holding the cord as it comes from the supply in the plane of the loops, a tightening hook, means for projecting the hook beneath the cord as it comes from said guide, means thereafter for lowering the guide to place the cord in the tightening hook, and means for locking the cord to the tightening hook and drawing the same outwardly to tighten the loops and knot about the compacted mouth.

In testimony whereof I affix my signature in presence of two witnesses.

FRANK O. LINDGREN.

Witnesses:
F. A. WHITELEY,
H. A. BOWMAN.